G. WARWICK.
WHEEL RIM AND PROCESS OF MANUFACTURING THE SAME.
APPLICATION FILED MAR. 24, 1920.
1,359,552.
Patented Nov. 23, 1920.
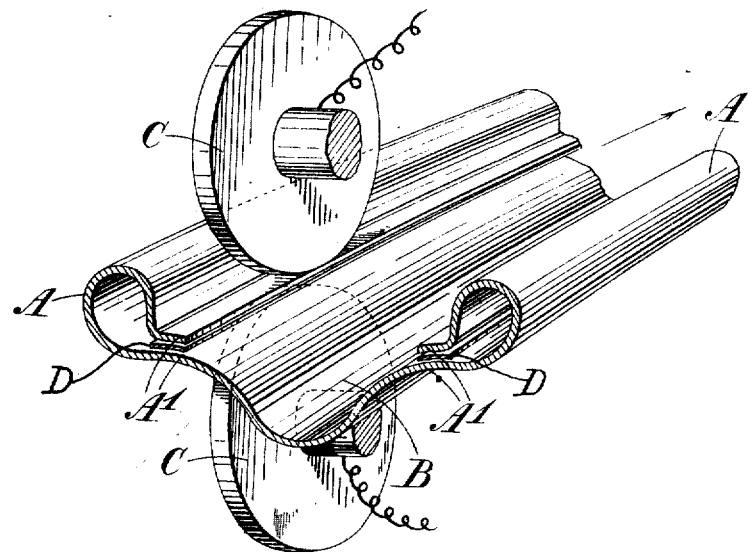
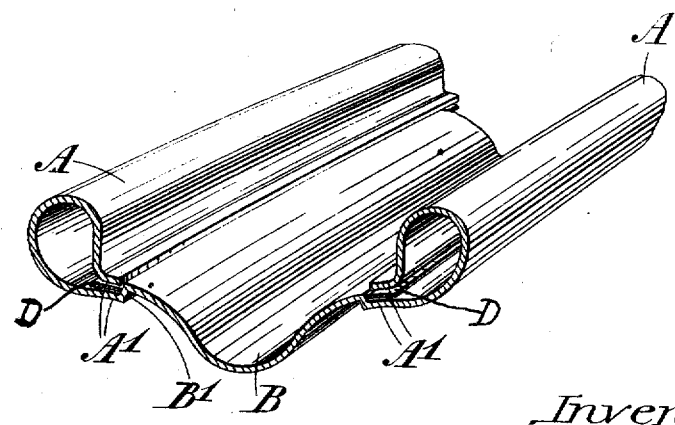

UNITED STATES PATENT OFFICE.

GEORGE WARWICK, OF SEVEN KINGS, ENGLAND.

WHEEL-RIM AND PROCESS OF MANUFACTURING THE SAME.

1,359,552.     Specification of Letters Patent.     Patented Nov. 23, 1920.

Application filed March 24, 1920. Serial No. 368,267.

*To all whom it may concern:*

Be it known that I, GEORGE WARWICK, a subject of the King of England, residing at Seven Kings, in the county of Essex, England, have invented certain new and useful Improvements in Wheel-Rims and Processes of Manufacturing the Same, of which the following is a specification.

This invention is for improvements in or relating to metal wheel-rims having beaded edges and the process of manufacturing the same, and has for its object to provide a rim wherein the over-turned edges shall be secured to the main body of the rim in a manner not heretofore adopted.

As is well known, the rims for pneumatic or other tires have their margins folded over into the trough of the rim or on to the outer side of the rim, and the edges of these margins are usually brazed to the body of the rim.

This brazing, by the commonly employed process, necessitates heating the whole rim with the result that the temper of the rim is impaired and also scaling occurs which necessitates pickling and polishing after the rim has been brazed.

By means of the present invention, it is proposed to produce rims whereof the edges of the overturned margins are secured to the body of the rim without having to heat up the whole rim and without destroying the smooth surface which the rim receives during the shaping process in the rolls.

According to this invention, the overturned edges of the rim margin are secured to the body of the rim by electrical brazing or soldering in the manner described hereinafter and pointed out in the claims.

By effecting the brazing or soldering by electrical means, the heating of the rim can be restricted to the areas where the brazing or soldering is to take effect, and thus the general temper of the rim is not affected and the smoothness of the surface is not destroyed.

The invention is now further described with reference to the accompanying drawings, in which:—

Figure 1 is a perspective view of a portion of one form of rim, according to this invention, and Fig. 2 is a similar view of an alternative construction.

The construction shown in Fig. 1 comprises two edges A rolled to a shape constituting a well-known form of tubular bead for tire rims and having two margins $A^1$ laid over and upon the surface of the main body B of the rim. The two beaded edges are soldered or brazed to the body along their edges by applying electrical contact-pieces C above and below the seam, so that the seam is heated by the electrical current between these contact-pieces, suitable pressure being applied if necessary to hold the edges of the margins on to the body. Either the work is drawn past the contact-pieces or the contact-pieces are moved along the work. A strip of brazing spelter D may be provided in each seam, or brazing spelter or solder, as may be desired, may be fed into the seams together with an appropriate flux.

In the alternative construction shown in Fig. 2, the body B of the rim is provided with shoulders as at $B^1$ against which the edges of the margins $A^1$ of the beads butt. It is, however, to be understood that the two forms of rim body and the form of the bead shown in the examples illustrated are merely given by way of illustration and that this invention is applicable to any form of rim in which the edges are secured to a central band or body.

From the above it will be seen that by effecting the brazing or soldering of the edges of the rim-margins to the body of the same by electrical means instead of by welding or other means at present adopted, the parts where the brazing or soldering is actually to be effected are sufficiently heated to bring about the required union without the whole rim becoming so hot as to have the undesirable results stated.

What I claim as my invention and desire to secure by Letters Patent is:—

1. A process of manufacturing metal wheel-rims of the kind described, comprising the steps of turning the margins of the rim over to lie against the body of the rim to form two seams, electrically heating each seam thus formed to brazing temperature while maintaining the remaining parts of the rim at a materially lower temperature, and melting a brazing alloy in the seam while thus heated, for the purpose and substantially as set forth.

2. A process of manufacturing metal wheel-rims of the kind described, comprising the steps of turning the margins of the rim over to lie against the body of the rim to form two seams, passing an electric current from one electrode to another situated on opposite sides of one of said seams, and simultaneously producing a relative feed between the rim and the electrodes, the rate of feed and the intensity of the electric current being so adjusted that only the said seam is heated to brazing temperature without melting the material of the rim at the joint while the remaining parts of the rim are maintained at a materially lower temperature, substantially as described.

3. The method of manufacturing metal wheel rims, comprising turning the margins of the rim inwardly to overlie the body of the rim to form seams, placing overlying electrodes on opposite sides of one of said seams, passing an electric current directly between said electrodes to produce a locally heated area only in that portion of the rim between said electrodes, melting a brazing alloy in the seam so heated, and producing a relative feed between the rim and the electrodes to subject the entire seam to the brazing current, substantially as described.

4. A metal wheel-rim having beaded edges integral therewith whereof the over-turned edges of the margins of the wheel-rim are electrically hard-soldered to the metal body of the rim without melting any portion of the metal of the rim, and without heating any part of the rim other than the joints at the margins of the overturned rim to a temperature materially lower than the temperature at which hard soldering is effected, substantially as described.

In testimony whereof I affix my signature.

GEORGE WARWICK.